(12) United States Patent
McAfee et al.

(10) Patent No.: US 8,585,909 B2
(45) Date of Patent: Nov. 19, 2013

(54) SELF CLEANING HIGH PRESSURE ABRASIVE SLURRY/FLUID CHECK VALVE

(76) Inventors: Wesley Mark McAfee, Conroe, TX (US); Mark Franklin Alley, Conroe, TX (US)

( * ) Notice: Subject to any disclaimer, the term of this patent is extended or adjusted under 35 U.S.C. 154(b) by 0 days.

(21) Appl. No.: 13/602,131

(22) Filed: Sep. 1, 2012

(65) Prior Publication Data
US 2013/0228526 A1 Sep. 5, 2013

Related U.S. Application Data

(60) Provisional application No. 61/530,853, filed on Sep. 2, 2011.

(51) Int. Cl.
  *B01D 21/26* (2006.01)
(52) U.S. Cl.
  USPC ........... 210/767; 210/788; 210/790; 210/117; 210/416.1; 210/411; 210/512.1; 210/322; 210/806; 137/15.06; 137/544; 417/432; 417/900
(58) Field of Classification Search
  USPC .............. 137/15.06, 544; 417/430, 431, 432, 417/434, 900; 210/767, 787, 788, 790, 117, 210/108, 416.1, 409, 411, 512.2, 512.1, 210/322, 806
  See application file for complete search history.

(56) References Cited

U.S. PATENT DOCUMENTS

| 6,904,982 B2 | 6/2005 | Judge et al. |
| 7,118,349 B2 * | 10/2006 | Oglesby .......................... 417/53 |
| 7,527,092 B2 | 5/2009 | McAfee |
| 7,794,215 B2 | 9/2010 | Oglesby |

* cited by examiner

*Primary Examiner* — Terry Cecil
(74) *Attorney, Agent, or Firm* — Hulsey P.C.; William N Husley, III; Loren T Smith

(57) ABSTRACT

This invention relates generally to a method and apparatus to allow high pressure pumping a fluid mixture of solid and/or abrasive particles with a liquid, and separating the fluid mixture into a solid and/or abrasive particle component and a cleaned liquid component. An embodiment includes surrounding the pump plunger/piston, and timely cycling the cleaned liquid to flush the pump check valves to displace erosive solid and/or abrasive material. Consequently, this invention allows for proper check valve sealing, extends the life of check valves, extends the life of the pump, and improves efficiency.

55 Claims, 11 Drawing Sheets

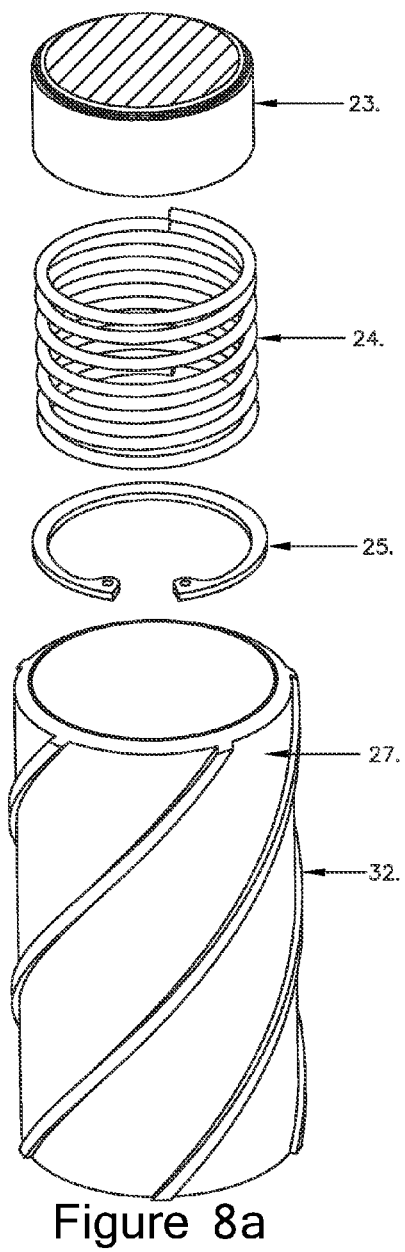
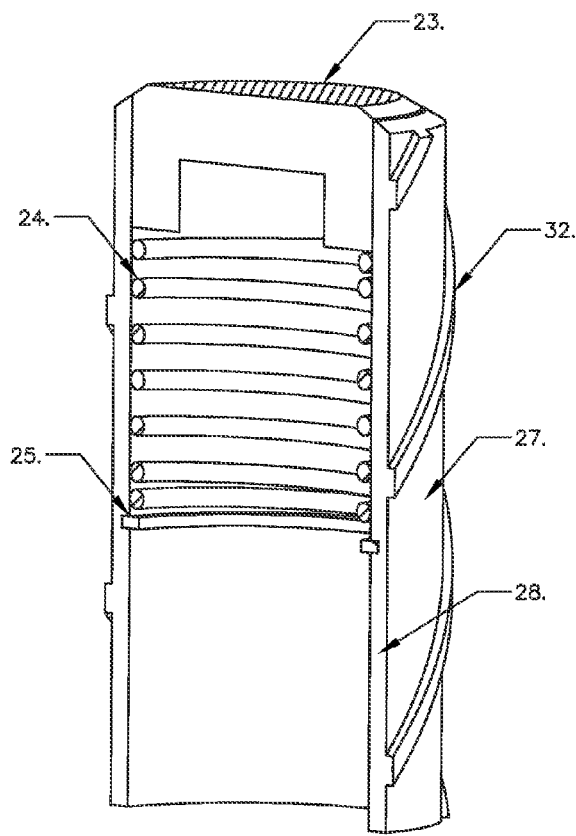
Figure 8a
Figure 8b

SELF CLEANING HIGH PRESSURE ABRASIVE SLURRY/FLUID CHECK VALVE

RELATED APPLICATION

This application claims the priority of U.S. 61/530,853 entitled "SELF CLEANING HIGH PRESSURE ABRASIVE SLURRY/FLUID CHECK VALVE" and filed on Sep. 2, 2011.

FIELD OF THE INVENTION

This invention relates generally to a method and apparatus to allow pumping of an abrasive or solid particle laden slurry or fluid mixture at high pressure.

BACKGROUND OF THE INVENTION

Positive displacement pumps, such as piston or plunger pumps are typically employed for high pressure applications, such as abrasive cutting and hydraulic fracturing operations. Such pumps are sometimes called triplex or positive displacement pumps. Plunger pumps typically include one or more plungers driven by a crankshaft toward and away from a chamber in a pressure housing (typically referred to as a "fluid end") in order to create pressure oscillations of high and low pressures in the chamber. These pressure oscillations allow the pump to receive a fluid at a low pressure and discharge it at high pressure through suction and discharge check valves. The suction and discharge check valves, open and close in conjunction with the fluid displacement of the pump plunger or piston, which in turn controls the flow of fluids through the pump.

Note that pumping particle fluids through a piston or plunger pump requires extensive maintenance and replacement of the check valves and plungers due to the nature of abrasive material eroding the pump parts making the overall pump life expectancy low.

Accordingly in many applications to protect the plunger pump from extreme wear while pumping abrasive materials, a less particle fluid is pumped through the plunger pump downstream to be mixed externally with an abrasive material stored in an abrasive pressure vessel as described in Judge et al., U.S. Pat. No. 6,904,982. The abrasive vessel has to withstand the high pressure of the plunger pump and requires the abrasive to be loaded without pressure, thus only the one batch of abrasive contained in the pressure vessel is available to be blended with the high pressure plunger pump fluid.

A problem that may exist in slurry pumps is that when the pump is stopped, the solid particles fall out of the carrier fluid. Cleaning out such solid particles from the pump before the pump may be restarted, takes the pump out of service a considerable amount of time.

Multiple plunger pumps are often employed simultaneously in large scale hydraulic fracturing operations with perhaps as many as thirty plunger pumps coupled together through a common manifold with each plunger pump having its own pressurized storage vessel.

A high pressure slurry plunger pump is disclosed by Oglesby, U.S. Pat. No. 7,794,215 wherein a high pressure piston style pump is used to pressurize a slurry material. The patent purports to create a clean fluid buffer that removes slurry from around the suction and discharge valves.

Purportedly, to "clean" the suction valve, before the piston is fully retracted, clean water is injected into the reservoir before the suction valve. In theory as the piston continues to reverse, the "clean" water is drawn through the suction valve such that when the piston is fully retracted the seating area of the suction valve is free of abrasive material. Similarly, to "clean" the discharge valve, as the piston nears full retraction, clean water is injected in front of the piston. At least in theory, as the piston completes its forward cycle, the injected clean water in front of the piston is the last to exit through the discharge valve thereby making the seating area of the discharge valve free of abrasive material. Besides the inherent difficulty of timing the clean water injections perfectly, there is an inherent problem with this solution. The clean water is allowed to mix with the slurry; therefore, it is almost impossible for the valves seating areas to truly be clear of abrasives (e.g. there will still be abrasive in the valve seating area). Therefore, what is needed is a solution which actually clears the valve seating areas of abrasives.

Abrasive cutting using a high pressure pump is described by McAfee U.S. Pat. No. 7,527,092 that requires batch storage of abrasive in a pressure vessel. High pressure abrasive vessels require frequent government code re-certification and are costly to purchase. Therefore, what is needed is a solution which allows abrasive to be pumped directly through a plunger pump at high pressure and does not require a costly pressure vessel.

Additionally, with all of the preceding, and other solutions available, it is difficult and costly to pump particles at high pressure, such as steel shot, formation propping material, or abrasive material, directly through a plunger or piston pump without damaging or destroying the pump.

BRIEF SUMMARY OF THE INVENTION

One aspect of the disclosed subject matter is to provide a fluid separation process and sequencing flow timing of abrasive solid particle slurry/fluids that allows successful pumping at high pressure without damaging the check valves or the plunger or piston of a high pressure plunger or piston pump.

Another aspect of the disclosed subject matter is self-cleaning or flushing of the check valve-seal interface while pumping an abrasive solid slurry/fluid under relatively high pressure without requiring a separate "clean" flushing fluid for transporting undesirable particles from the check valve-seal interface.

Another aspect of the disclosed subject matter is that the pump plunger or piston is always surrounded and/or only in contact with a clean fluid, radically reducing wear over prior systems.

Another aspect of the disclosed subject matter is when the plunger or piston pump is stopped, the abrasive and/or solid particles drop out of the carrier fluid, and are not required to be removed before restarting the plunger or piston pump.

Another aspect of the disclosed subject matter is allowing the pumping of steel shot or other natural or man-made solid particles at high-pressure.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of the appended claims and any claims filed later.

BRIEF SUMMARY OF THE DRAWINGS

The novel features believed characteristic of the disclosed subject matter are set forth in the claims. The disclosed subject matter itself, however, as well as a preferred mode of use, further objectives, and advantages thereof, will best be understood by reference to the following detailed description of illustrative embodiments when read in conjunction with the accompanying drawings, wherein:

FIGS. 2, 2a, 2b, 3, 3a, 3b, 4, 4a, 4b, 5, 5a, 5b, 6, 6a, and 6b depict exemplary cross sectional and exploded perspective views of one embodiment of the disclosed subject matter.

FIGS. 7a, 7b, 8a, and 8b depict exemplary exploded and cross sectional perspective views of an embodiment of the check valve.

FIGS. 9, 9a, and 9b depict an exemplary cross sectional view of a single-stage separation embodiment of the disclosed subject matter.

DETAILED DESCRIPTION OF ILLUSTRATIVE EMBODIMENTS

Although described with particular reference to abrasive and/or solid particle laden high pressure pumping, those with skill in the arts will recognize that the disclosed embodiments have relevance to a wide variety of areas in addition to those specific examples described below.

All references, including publications, patent applications, and patents, cited herein are hereby incorporated by reference to the same extent as if each reference were individually and specifically indicated to be incorporated by reference and were set forth in its entirety herein. However, in the event of conflict between such incorporated references, this disclosure shall supersede.

As used herein, abrasive is intended to include solid particles (e.g. sand, waste water, metal slag, copper slag, diamonds, glass beads, composites, wood chips, nut shells, pulverized minerals, garnet sand, ball bearings, steel shot, drilling mud, oilfield fluid, proppant, or other natural or manmade solid particles). Additionally, particle laden slurry, slurry, fluid mixture, and abrasive fluid are used interchangeably throughout. "Clean Fluid" is fluid which has been made free or relatively free of all solid particles or abrasive type material.

The disclosed subject matter relates generally to a method and apparatus to allow pumping at high pressure an abrasive or solid particle laden slurry/fluid mixture through a separator, which may be a hydrocyclone, filter screen, or other type of separator, and the transporting and flushing of the abrasive and/or solid particles so that the abrasive and/or solid particles do not impede the sealing or closing of the check valves.

Figure 1:
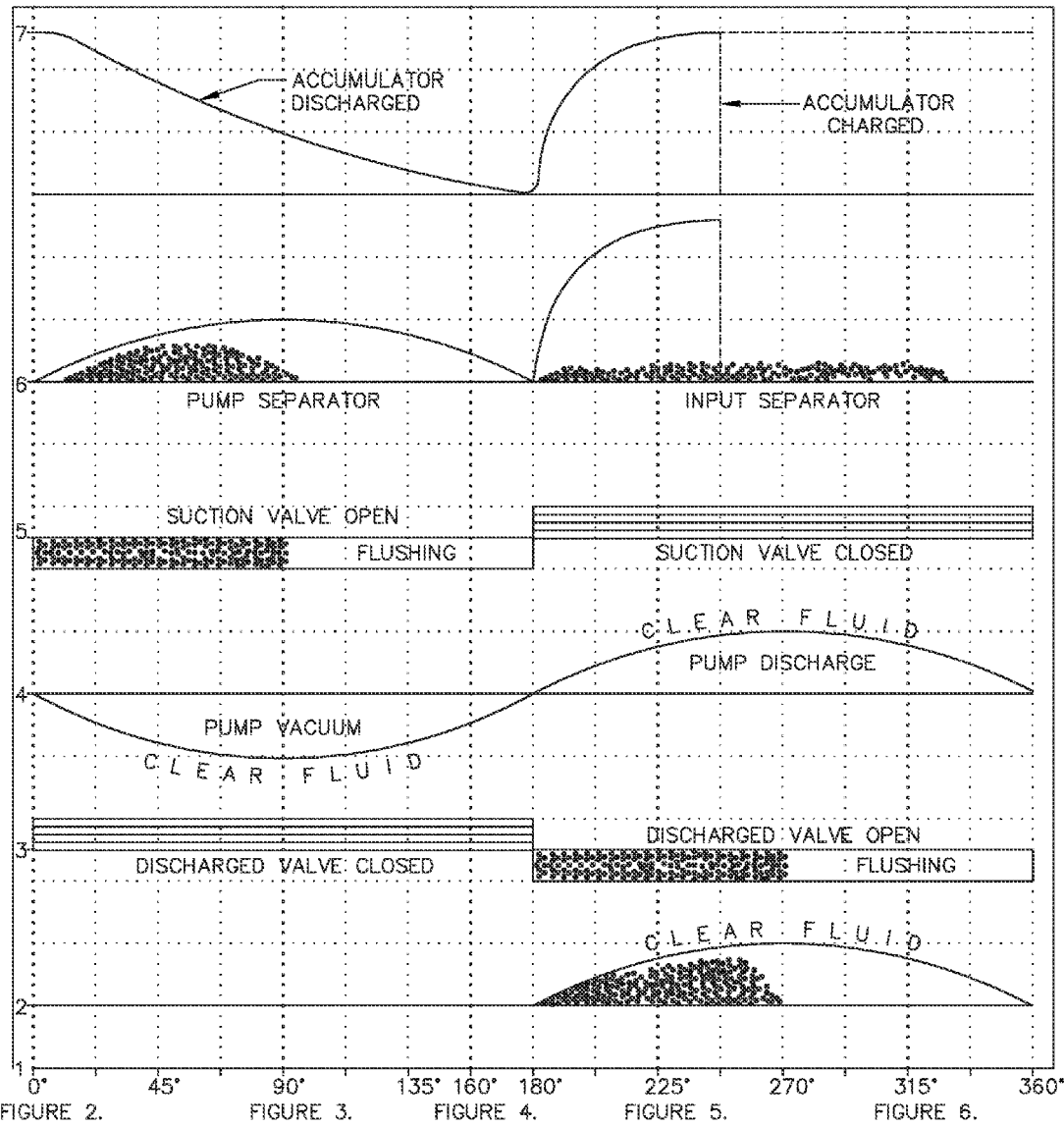
FIG. 1 is an exemplary process timing chart that depicts the flow sequence timing of an embodiment of the disclosed subject matter of separating particle fluid flow and state of each major component in degrees of plunger pump crankshaft angle and refers to specific subsequent FIGUREs for plunger position, separation and flushing timing.

FIG. 1 is an exemplary process timing chart that depicts the flow sequence timing of an embodiment of the disclosed subject matter of separating particle fluid flow and state of each major component in degrees of plunger pump crankshaft angle and refers to specific subsequent FIGUREs for plunger position, separation, evacuation and flushing timing as well as super-charging and discharge. By looking at the cycle as depicted in degrees at the bottom of the FIG. 1 chart, it becomes clear where all major components are in the cycle as well as the progress of both the particle fluid and the clean fluid through the disclosed subject matter.

Figure 2:
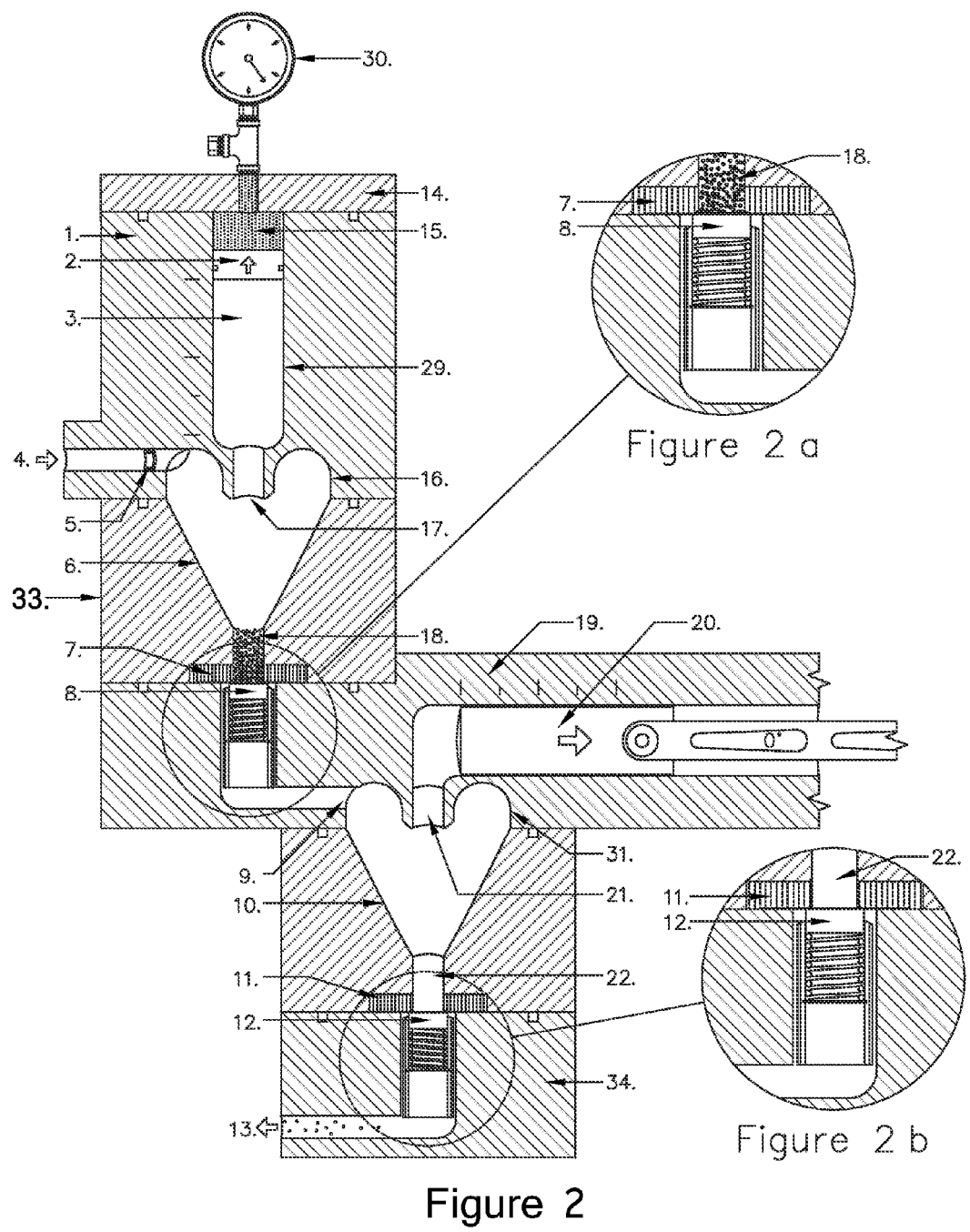
Figure 3:
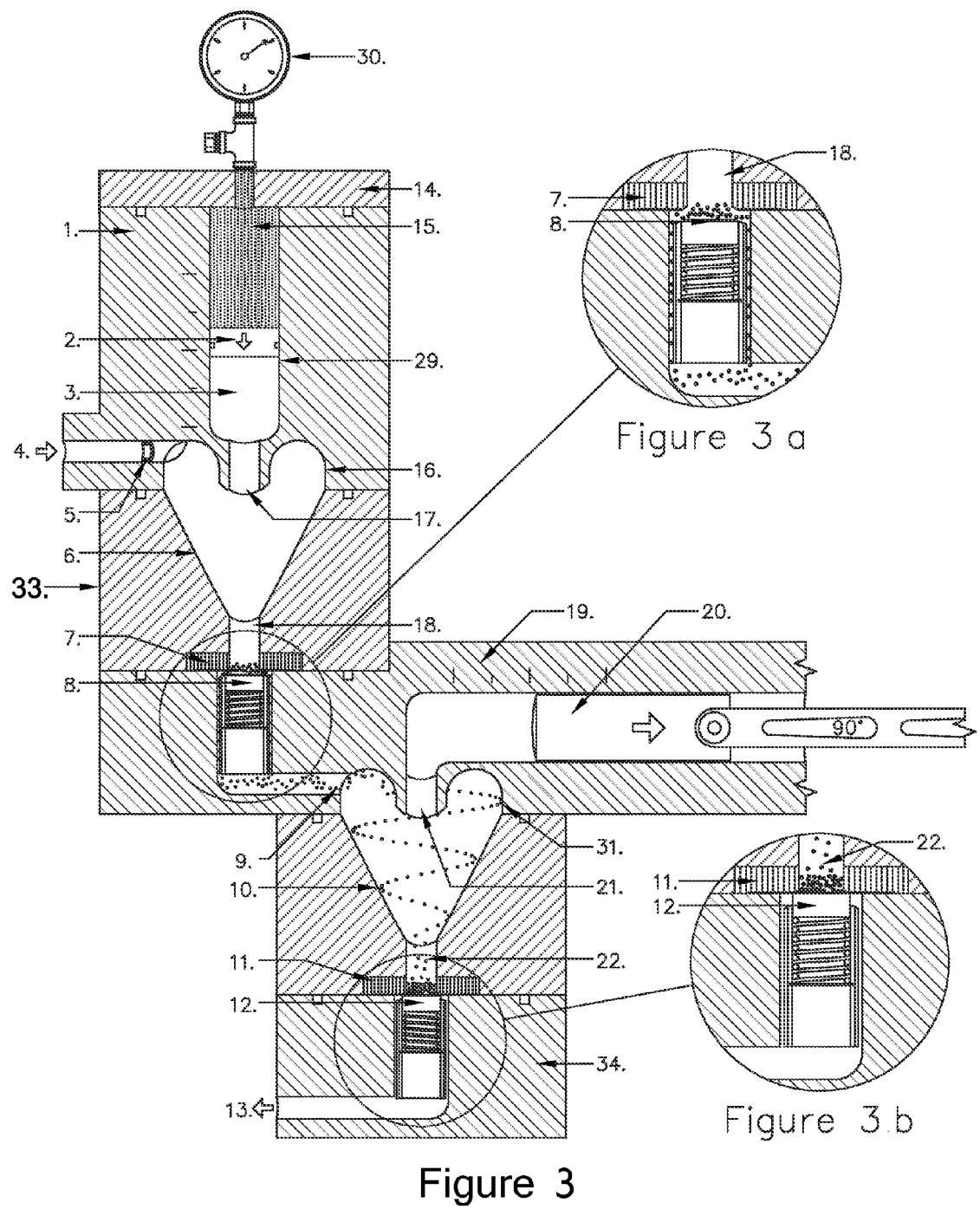

FIGS. 2, 2a, and 2b depict cross-sectional views of one embodiment of the disclosed subject matter. Referring to FIG. 2, this particular embodiment has a hydrocyclone as an intake separator 6 and another hydrocylone as a pump separator 10. Each hydrocyclone, intake separator 6, pump separator 10 separates the abrasive and/or solid particle laden slurry into (i) a "clean fluid" substantially or completely free of abrasive and/or solid particles and (ii) an "particle fluid" a very densely laden fluid with abrasive and/or solid particles. After separation, the clean fluid that has been separated from the abrasive and/or solid particle slurry is used to self-clean the suction check valve 8 and discharge check valve 12 after the particle fluid (e.g. the abrasive and/or solid particles slurry solids) have passed through the suction check valve 8 and discharge check valve 12.

The separation starts when a slurry centrifugal pump (not shown) feeds the abrasive and/or solid particle laden slurry through orifice 5 via particle laden slurry intake 4 tangentially into the intake cylinder annulus 16 of an intake separator 6 at a relatively high velocity. As the centrifugally pumped abrasive or solid particle laden slurry/fluid mixture enters tangentially into the intake cylinder annulus 16 of the intake separator 6, the abrasive and/or solid particle laden slurry begins to rotate within intake separator 6. The rotating moment gyration of centrifugal force slings the solid particle or abrasive particle slurry solids to the outer portion of the intake separator 6 leaving a vertically oriented column of clean fluid rotating in the center of the intake separator. In this particular embodiment, the abrasives-slurry particles, while losing velocity, slide down the angled sides of the funnel shaped intake separator 6 and collect at the bottom of the lower portion of intake separator 6 at the intake abrasive storage queue 18 on top of the suction check valve 8.

While suction check valve 8 is closed, the column of clean fluid travels to an accumulator vortex passage 17 in the top of the intake separator 6 and into an accumulator cavity 3 of the accumulator 29. The clean fluid is pressurized in the accumulator cavity 3 by the upward-moving force of the clean fluid column, the slurry centrifugal pump (not shown) from which the slurry is received via particle laden slurry intake 4 and through orifice 5; and a downward force. In an embodiment, the downward force is achieved by actuation of hydraulic, pneumatic, or mechanical force to reduce the volume in the accumulator cavity 3. In this particular embodiment, the downward force is achieved with a gas 15 actuated piston 2 traveling downward from the top of the accumulator cavity 3. The gas 15 may be nitrogen or an alternate gas. While the clean fluid is passed upwardly through accumulator vortex passage 17 and into the accumulator 29, more solid particle and/or abrasive components are collected in the intake abrasive storage queue 18 of the intake separator 6. As will be discussed in more detail below, suction check valve 8 is closed while plunger 20 is extending in a discharge stroke (e.g. forward, pushing or power stroke; where the plunger is traveling from the position depicted in FIG. 4 to the position depicted in FIG. 2).

Figure 4:
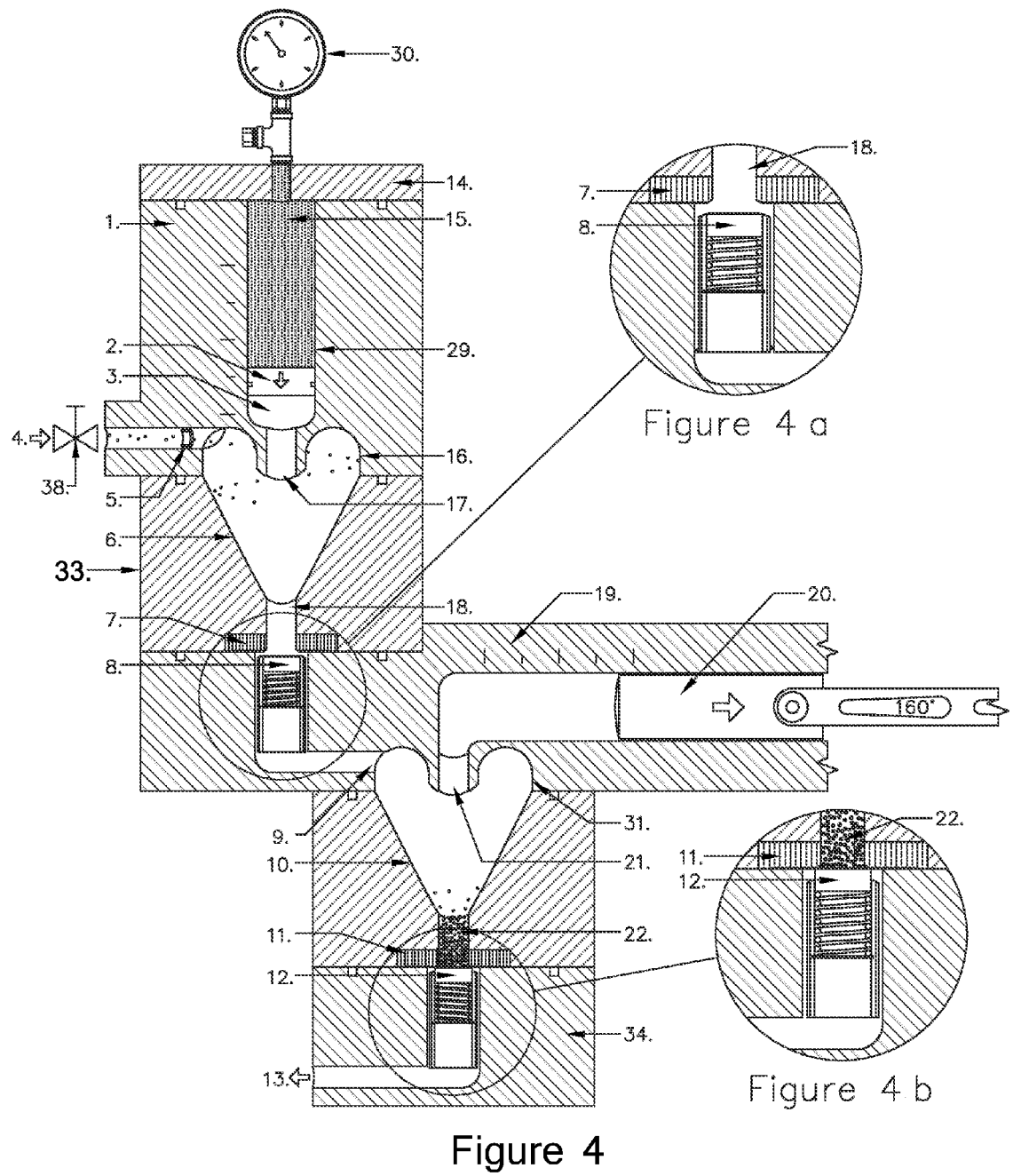
Figure 5:
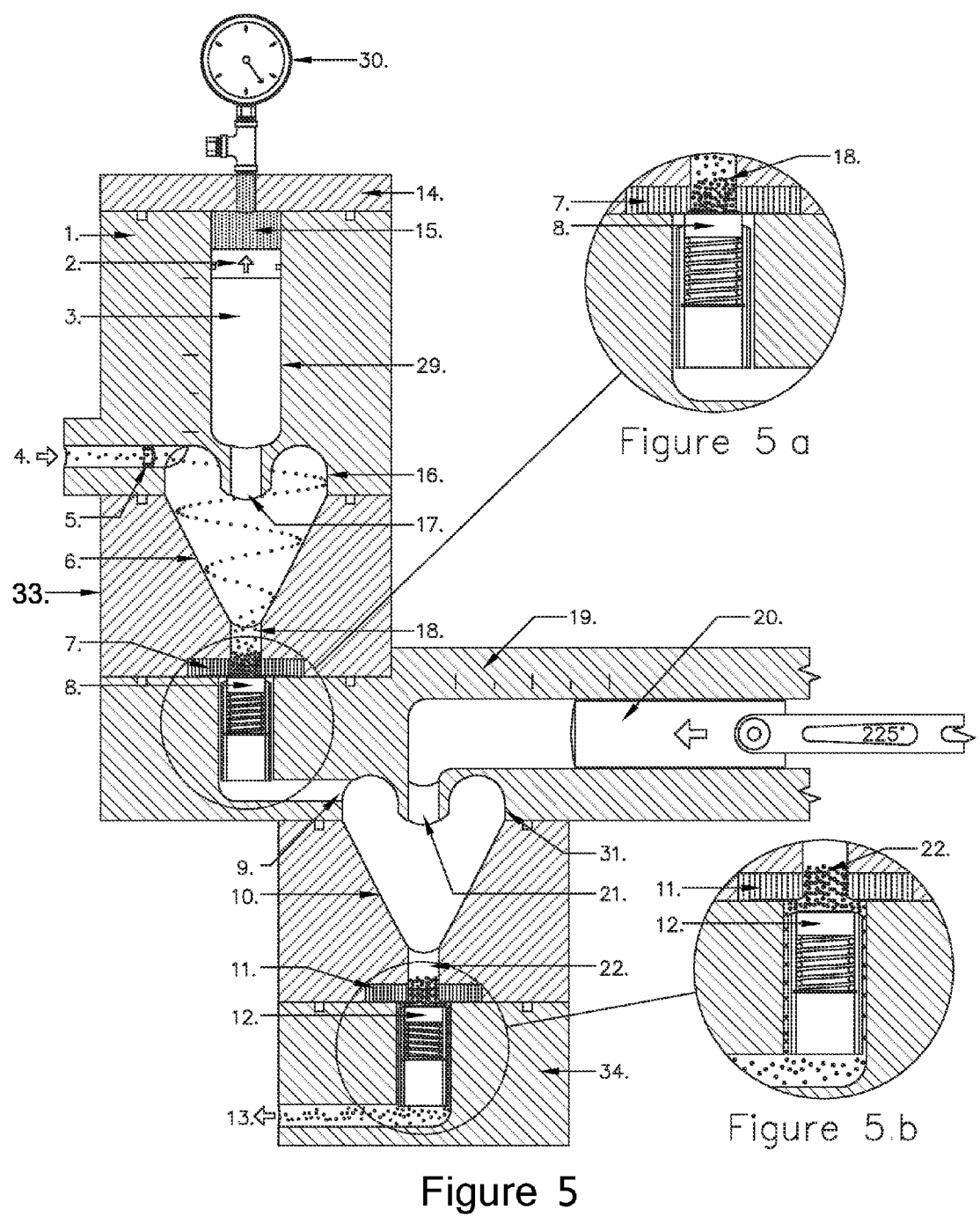
Figure 6:
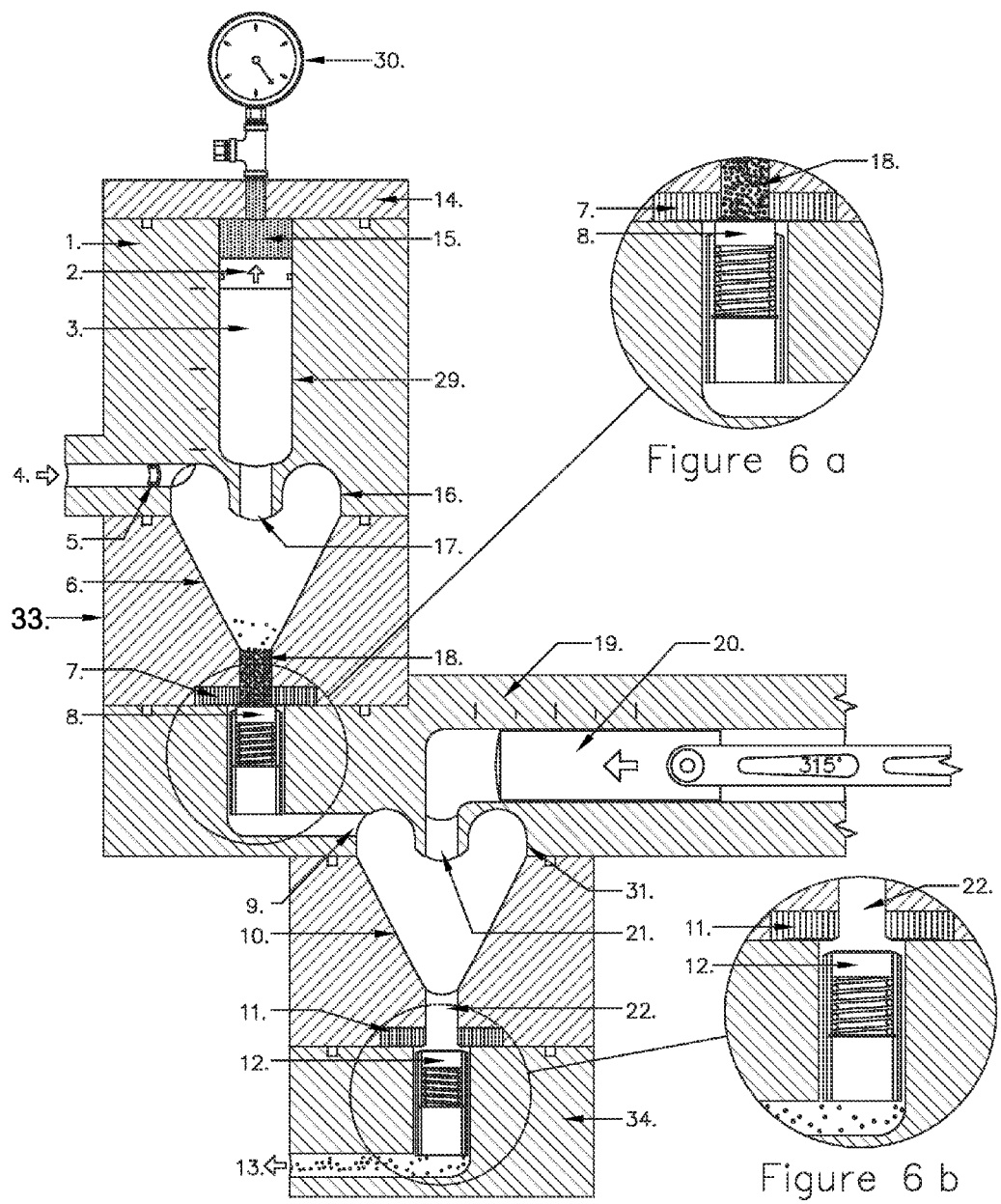

When plunger 20 is retracting in a suction stroke (e.g. suction or reverse or retracting stroke; where the plunger is traveling from the position depicted in FIG. 2 to the position depicted in FIG. 4), suction check valve 8 opens and the solid particle or abrasive components which had collected in the intake abrasive storage queue 18 of intake separator 6 are discharged first through suction check valve 8 by a combination of the suction provided by the plunger 20 retracting and the downward force of the clean fluid in the accumulator cavity 3. The clean fluid passes through the accumulator vortex passage 17 and through suction check valve 8 in a flush cycle. Because the clean fluid in the accumulator cavity 3 is solid particle or abrasive free, the flush cycle clears the suction check valve 8 of solid particle or abrasive material. While the accumulator 29 is discharging the clean less dense fluid, the slurry centrifugal pump's (not shown) pressure feed pump flow is restricted by orifice 5 and consequently has less flow than the output flow through the suction check valve 8. Also, because the flush cycle is purely pressure driven, there is no need for complicated timing conditions that are found in other abrasive pumping systems. It should be noted that accumulator cavity 3 should be of sufficient capacity to store enough of the clean fluid to outlast the suction stroke of plunger 20.

As the abrasive and/or solid particle laden slurry passes through suction check valve 8, it traverses along the pump separator intake 9 to the pump separator 10. Again, as the abrasive and/or solid particle laden slurry enters tangentially into the pump cylinder annulus 31 of the pump separator 10 and the abrasive or solid particle slurry travels in a spiral where centrifugal forces sling the abrasive and/or solid particle slurry solids to the outer portion of the pump separator 10 creating a rotating column of clean fluid in the center. The abrasive and/or solid particle slurry solids slide down the angled sides of the funnel shaped pump separator 10 and the solid particle or abrasive-slurry solids collect at the bottom in the discharge abrasive storage queue 22 of the pump separator 10 on top of the discharge check valve 12.

While discharge check valve 12 is closed, the clean fluid travels to a pump vortex passage 21 in the top of the pump separator 10. The clean fluid travels through the pump vortex passage 21 to fill the void made from the suction stroke of plunger 20. While the clean fluid is passed upwardly through the pump vortex passage 21 and into the void made by the retracting plunger 20, the solid or abrasive particle solids are collected in the discharge abrasive storage queue 22 of the pump separator 10.

When plunger 20 begins its discharge stroke, suction check valve 8 closes and discharge check valve 12 begins to open. During the brief time that suction check valve 8 is closing, there is the possibility of a backflow from pump separator 10 through pump separator intake 9 and into suction check valve 8. To explain this further, when plunger 20 is transitioning from a suction stroke to a discharge stroke, the biasing of suction check valve 8 begins to seal suction check valve 8. However, as the discharge stroke of plunger 20 begins to force the mixture of clean fluid and particle fluid back through suction check valve 8 (e.g. the backflow), there is the possibility of reintroducing abrasive and/or solid particles between the suction check valve 8 and the suction valve seat 7. Therefore, it is important that suction check valve 8 be designed so that this backflow does not reintroduce abrasive and/or solid particles into suction valve seat 7 (this is discussed in more detail in reference to FIGS. 7-8).

Continuing, the discharge stroke of plunger 20 is similar to the flush cycle discussed above. As the plunger 20 discharge stroke displaces the clean fluid that filled the void (created by plunger 20's suction stroke) and pump vortex passage 21, the clean fluid forces the abrasive and/or solid particle slurry solids, which have collected in discharge abrasive storage queue 22, through discharge check valve 12 and ultimately forces the clean fluid through discharge check valve 12 to cleanse abrasive and/or solid particles from the discharge valve seat 11. Depending on the viscosity of the slurry entering the separator, aspects of the funnel may be varied to achieve the optimal entry velocity. Examples of such aspects that may be varied include geometry, length, and diameter of funnel Also, it should be noted that the void made from the retracting plunger 20 should be of sufficient capacity to store enough of the clean fluid to cleanse abrasives from the discharge valve seat 11 by the time plunger 20 completes its discharge stroke.

Referring now to FIGS. 7a, 7b, 8a, and 8b, which depict exploded and cross sectional perspective views of exemplary embodiments of the suction check valve 8 and discharge check valve 12. The check valve disk 23 is preferably made from an abrasive resistant material such as silicon carbide, although other abrasive resistant materials could also be employed. The spring 24 assists closing the suction check valve 8 and discharge check valve 12. The check valve disk 23 moves substantially freely inside check valve housing 28 and is under upward pressure from spring 24 (e.g. biased closed). Spring 24 is between check valve disk 23 and snap ring 25, also inside the check valve housing 28.

Figure 7A:
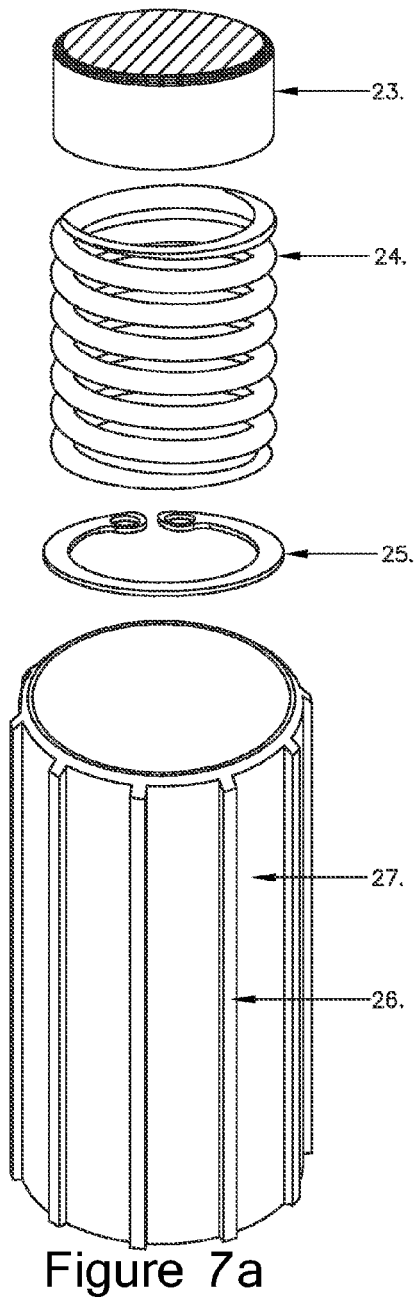
Figure 7B:
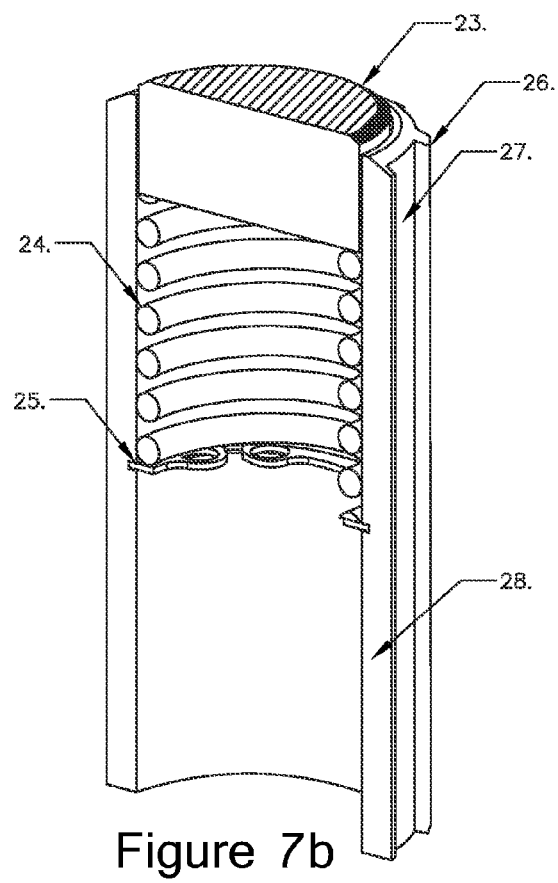

An exemplary embodiment of an assembled check valve is depicted in FIGS. 7b and 8b and is secured into the discharge housing assembly 34 and becomes discharge check valve 12, and an assembled check valve as shown in 7b or 8b is secured into the pump housing 19 and becomes suction check valve 8. The flow of fluid between the cylinder of either the pump housing 19 or the discharge housing assembly 34 and the outside of check valve housing 28 passes in the groove spaces 27. The length of the check valve housing 28 works to delay the abrasive and/or solid particle slurry solids from interfering with the suction check valve seat 7 or the discharge valve seat 11 when the suction check valve 8 or the discharge check valve 12, respectively, are closing due to the pump cycle. As such, it is important that the length of the groove spaces 27 are sufficiently long so that as the suction check valve 8 or discharge check valve 12 are closing, the backflow of solid particle or abrasive laden slurry does not reintroduce abrasive or solid particles into the suction valve seat 7 or discharge valve seat 11. To put this a different way, the groove spaces 27 must be sufficiently long so that solid or abrasive particles will not be able to travel far enough during the brief period of potential backflow to reach the suction valve seat 7 or discharge valve seat 11.

The size, height, number, and/or spacing of straight lands 26 in FIGS. 7a and 7b and/or the spacing, number, depth and/or shape of groove spaces 27 can be adjusted to accommodate different types, compositions, concentrations, and sizes of solid particles or abrasive (e.g. sand, waste water, metal slag, copper slag, diamonds, glass beads, composites, wood chips, nut shells, pulverized minerals, garnet sand, ball bearings, steel shot, drilling mud, oilfield fluid, proppant, etc.). Additionally, the length of check valve housing 28 and/or groove spaces 27 can be adjusted to accommodate a longer or shorter particle backflow delay time potentially required due to the particular circumstances.

FIG. 8a depicts an alternative embodiment of check valve housing 28. In this embodiment, the groove spaces 27 spiral about the check valve housing 28. This configuration takes into account the spinning of the fluid within the intake separator 6 or pump separator 10, especially in the case of such a separator being a hydrocyclone. Additionally or alternatively, spiraled groove spaces provide the ability to increase the particle transit time without having to vary the length of the check valve housing 28. The shape, angle, profile, width and curvature of the check valve housing spiral lands 32 in FIG. 8a may be adjusted in conjunction with the groove spaces 27 to allow faster or slower flow, and lesser or greater transit times of solid particles or abrasive.

Figure 9:
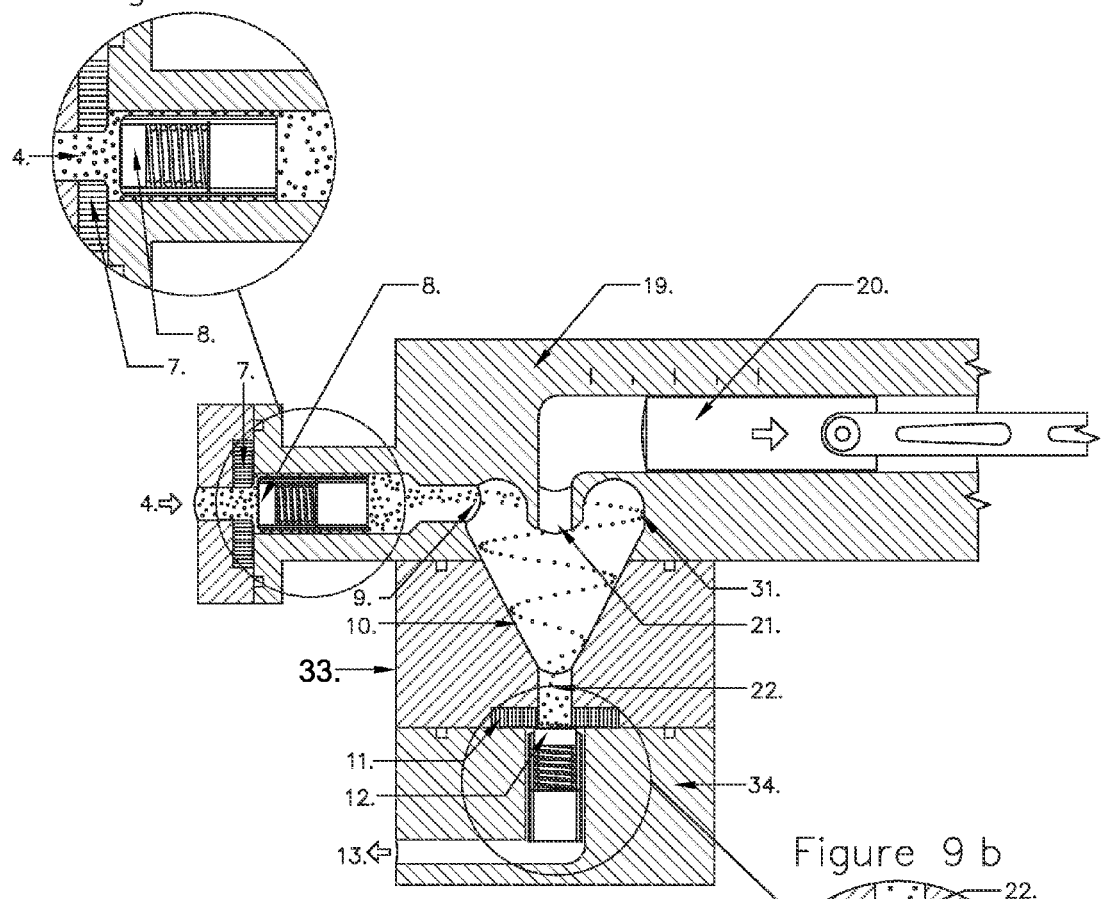

FIG. 9 depicts an alternative embodiment of the disclosed subject matter in which one separator, pump separator 10, is utilized rather than two separators in fluid communication with each other as described in FIG. 2 above. This single pump separator 10 could be used when the slurry mixture contains solid particles and not abrasive particles. In this particular embodiment, a solid particle fluid slurry pump (not shown), or other devices known in the art for transferring a solid particle fluid slurry, pumps the solid particle fluid slurry mixture from the solid particle fluid slurry transfer pump to the fluid end 33 via particle laden slurry intake 4 where the fluid slurry can flow through suction check valve 8 from particle laden slurry intake 4 while the plunger 20 is in its suction stroke.

It is well known in the art of positive displacement pumps that the suction check valve 8 and discharge check valve 12 open and close in conjunction with the fluid displacement of the pump plunger 20, which in turn controls the flow of fluids through the fluid end 33.

Referring again to FIG. 9, suction check valve 8 does not experience a large difference of pressure across suction check valve 8 and suction valve seat 7 while opening and closing. The pressure difference from the fluid slurry pump (not shown) in particle laden slurry intake 4 and the pump separator intake 9 is low (about 150 PSI), when the pump plunger 20 is discharging while suction check valve 8 is closing.

Referring now to FIG. 9a, the low pressure difference between the suction check valve 8 and suction valve seat 7 while closing should not allow a non-abrasive solid particle, such as steel shot traveling at a low velocity due to low pressure difference, to erode suction check valve 8 and suction valve seat 7.

FIG. 9a depicts the check valve 8 in an open position to allow the solid particle fluid slurry to pass through check valve 8 and be drawn through pump separator intake 9 into pump separator 10. The pump separator 10, or other devices known in the art capable of separating components of different density from a fluid slurry mixture, quickly separates the solid particle components having greater mass from the solid particle laden slurry. The process of separation and flow through the pump separator 10 is substantially the same as that previously described.

As with other embodiments described herein, this embodiment also provides a clean fluid which always surrounds plunger 20. Here pump separator 10 also provides staged timing of the solid particles transported first through discharge check valve 12 and then follows the solid particles with clean fluid to flush the discharge check valve 12. By always operating plunger 20 in clean fluid, the life and efficiency of the pump are greatly increased.

The high pressure applied to the discharge check valve 12 in a positive displacement pump can cause significant erosion of the discharge check valve 12 and the discharge valve seat 11 if, while the discharge check valve 12 is closing, there are particles between the discharge check valve 12 and the discharge valve seat 11. To put this another way, when any solid particles are between the valve sealing interface, that is, between the discharge valve seat 11 and discharge check valve 12, the check valve parts are quickly eroded because of the high velocity of the solid particles between the two sealing surfaces during discharge check valve 12 closing. The operation of this embodiment, similar to the other described embodiments, allows the discharge check valve 12 to be free of solid particles during closing, thereby avoiding the potential erosion of the discharge check valve 12 and increasing the efficiency of the positive displacement pump.

Figure 10:
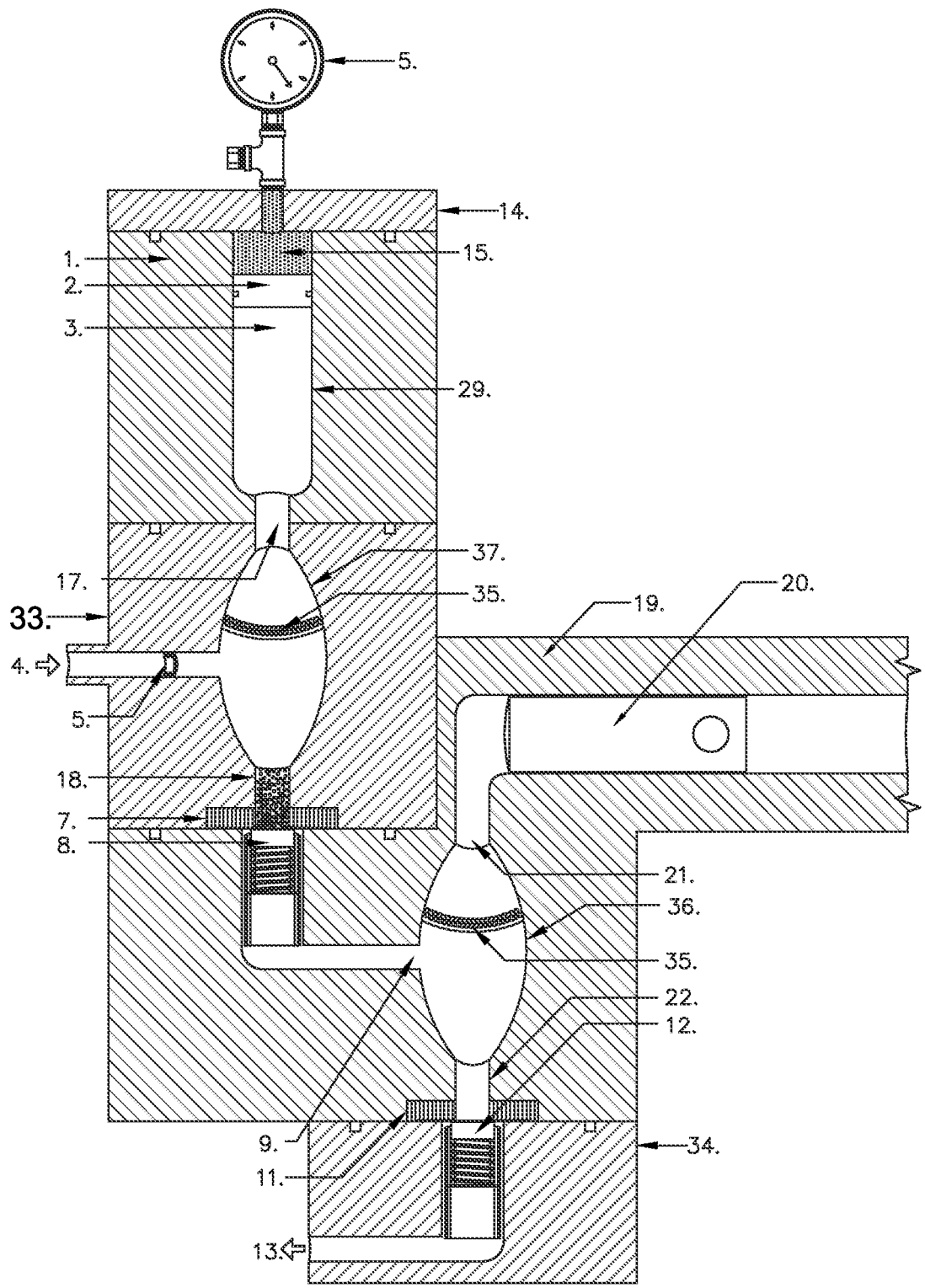
FIG. 10 depicts an exemplary cross sectional view of an embodiment of the disclosed subject matter not utilizing hydrocyclones but utilizing particle filter screens.

FIG. 10 depicts a cross-sectional view of an embodiment of the disclosed subject matter employing particle filter screens 35 to allow pumping a particle laden fluid slurry through a positive displacement pump at high pressure.

In this embodiment, a slurry centrifugal pump (not shown), or other devices known in the art for transferring a fluid slurry, pumps a particle laden fluid slurry from a slurry centrifugal pump to the fluid end 33 particle laden slurry intake 4 where the abrasive and/or solid particle laden slurry can flow from particle laden slurry intake 4 into separator cavity 37 where particle filter screen 35 is configured to filter separate the abrasive and/or solid particle laden slurry into a particle slurry and clean fluid.

As the abrasive and/or solid particle laden slurry is being pumped into separator cavity 37, the particle filter screen 35 allows only clean fluid to flow through the perforations in the particle filter screen 35 and the particle fluid is rejected from passing through the particle filter screen 35. The clean fluid that has passed through the particle filter screen 35 then flows into and fills accumulator cavity 3 compressing the charge gas 15 the accumulator 29 and the particle fluid that was rejected by the particle filter screen 35 migrates to the bottom of separator cavity 37 where the rejected particle fluid collects in storage queue 18 awaiting for plunger 20 to make its suction stroke.

As plunger 20 starts its suction stroke, suction check valve 8 opens and the particle slurry collected in storage queue 18 flows through suction check valve 8 with the particle slurry flow being assisted by the cleaned fluid discharging from the pressurized accumulator cavity 3 flowing through particle filter screen 35. After the particle slurry has passed through suction check valve 8 the clean fluid continues to discharge from the pressurized accumulator cavity 3 and the clean fluid flushes suction check valve 8 to remove any particles that could restrict suction check valve 8 from closing and fully sealing when plunger 20 starts its discharge stroke.

Before plunger 20 starts its discharge stroke the particle fluid and clean fluid have passed through pump separator intake 9 into pump separator cavity 36 being drawn in by plunger 20's suction stroke and assisted by discharging accumulator 29. As the particle fluid and clean fluid are being drawn in by plunger 20 into pump separator cavity 36 and through particle filter screen 35 in pump separator cavity 36, again the mixture of the particle fluid and clean fluid are filter separated by particle filter screen 35 which only allows the clean fluid to be drawn through particle filter screen 35 by plunger 20 and the particle slurry that was rejected by the particle filter screen 35 migrates to the bottom of separator cavity 36 where the rejected particle fluid collects in storage queue 12 awaiting plunger 20 to make its discharge stroke.

As plunger 20 starts its discharge stroke, discharge check valve 12 opens and the particle fluid collected in storage queue 22 flows through discharge check valve 12 with the particle fluid flow being assisted by the cleaned fluid discharging from plunger 20 discharge stroke flowing through particle filter screen 35. After the particle fluid has passed through the discharge check valve 12 the clean fluid continues to discharge from the plunger 20 discharge stroke and the cleaned fluid flushes discharge check valve 12 to remove any particles that could restrict discharge check valve 12 from closing and fully sealing when plunger 20 starts its suction stroke and the fluid slurry and clean fluid have exited out the discharge fluid passage 13.

Figure 11:
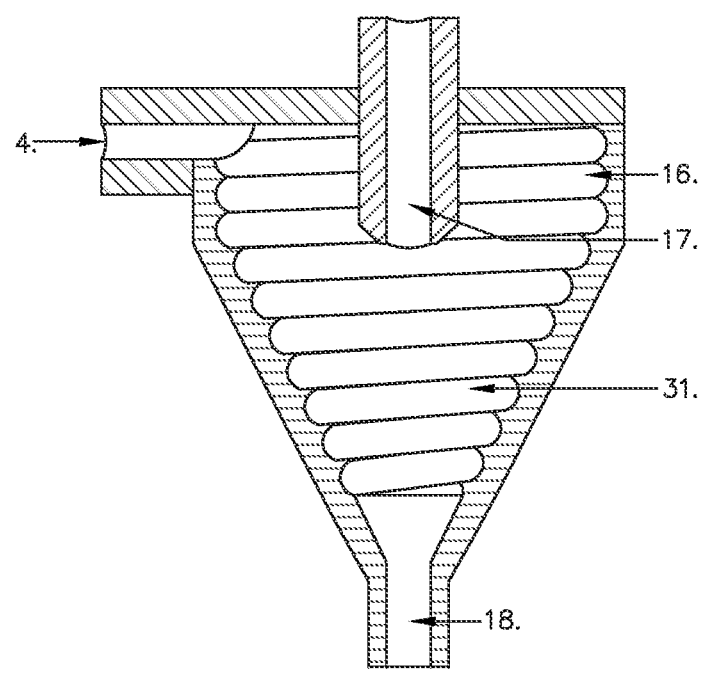
FIG. 11 depicts an exemplary cross-sectional view of a hydrocyclone accelerator.

FIG. 11 depicts a cross-sectional view of an embodiment of the disclosed subject matter employing an alternate design for a separator that may be utilized. Referring to FIG. 11, the hydrocyclone accelerator speeds up the operation of the previously discussed hydrocyclone, accelerating the hydrocyclone's cycle time and thereby speeding up the separation of abrasive and/or solid particle laden slurry into (i) a "clean fluid" substantially or completely free of abrasive and/or solid particles and (ii) a "particle fluid" (e.g. a particle fluid) a very densely laden fluid with abrasive and/or solid particles.

As with other hydrocyclones, including the hydrocyclones depicted as the separators in FIGS. 2, 3, 4, 5, and 6, the hydrocyclone accelerator depicted in FIG. 11 has a particle laden slurry intake 4 through which abrasive and/or solid particle laden slurry is received and passes tangentially into the intake cylinder annulus 16 of an intake separator, in this particular embodiment of a hydrocyclone accelerator, at a relatively high velocity. The ensuing rotating moment gyration of centrifugal force slings the abrasive and/or solid particle slurry solids to the outer portion of the hydrocyclone accelerator and, similar to other hydrocyclones, leaves a vertically oriented column of clean fluid rotating in the center of the hydrocyclone accelerator.

However, the hydrocyclone accelerator, unlike a typical hydrocyclone, has continuous grooves or threads 31 spiraling downward in part or all of the hydrocyclone accelerator's inside diameter (i.e. sidewall). These continuous grooves or threads 31 may run from the top of the intake cylinder annulus 16 to the smaller tapered outlet at the bottom, in this embodiment described as intake abrasive storage queue 18 (as previously discussed in FIGS. 2, 3, 4, 5, 6, 9 and 10 above). The pitch, depth, width and positioning of the continuous grooves or threads 31 may be varied to increase or decrease the number of separation rotations (or sidewall traverses) and thereby increase or decrease the aggressiveness with which separation is urged. Decreasing the number of times the abrasive and/or solid particle laden slurry must traverse the sidewall, decreases the time to achieve separation and therefore, effectively the time for solid particle or abrasive and/or solid particle slurry solids to reach the intake abrasive storage queue 18. Along with reduced separation time, the continuous grooves or threads 31 also result in a faster generated vortex flow upward into the accumulator vortex passage 17.

The continuous grooves or threads 31 force the more dense particles to take a predictable path, making the separation time predictable and programmable, as required separation time can be incorporated into the separator design so that the separator is specially constructed with appropriately sized and pitched continuous grooves or threads 31.

Not shown in FIG. 11 is an additional configuration that may be used to accelerate the operation of a hydrocyclone. Multiple smaller hydrocyclones may be employed as separators in the embodiments described in FIGS. 2, 3, 4, 5, 6 and 10, and these multiple smaller hydrocyclones may be a variety of typical hydrocyclones or the hydrocyclone accelerator depicted in FIG. 11. The smaller hydrocyclones have faster cycle times as they have less abrasive and/or solid particle laden slurry to separate. Furthermore, it is possible to have the multiple smaller hydrocyclones' input and output flows plumbed together in parallel.

Although example diagrams to implement the embodiments of the disclosed subject matter have been provided, one skilled in the art, using this disclosure, could devise alternate arrangements and make substitutions and each is intended to be included herein.

Although described as specific embodiments, one or more elements of any particular embodiment could be substituted or added to another embodiment and remain within the scope of this disclosure.

In addition to the above described embodiments, those skilled in the art will appreciate that this disclosure has application in a variety of arts and situations and this disclosure is intended to include the same.

What is claimed is:

1. A method for separating and pumping a particle laden slurry, the method comprising the following steps:
    (i) receiving the particle laden slurry under pressure into a first separator cavity of a first separator, wherein the particle laden slurry comprises:
        a fluid; and
        abrasive and/or solid particles;
    (ii) separating at least a portion of the particle laden slurry with said first separator, thereby:
        creating a first particle fluid, said first particle fluid more concentrated with said particles than the particle laden slurry; and
        creating a first clean fluid, said first clean fluid substantially free of said particles;
    (iii) forcing said first clean fluid into:
        an accumulator cavity; or
        a void, said void created by the suction stroke of a positive displacement pump;
    (iv) permitting said first particle fluid to travel through a first check valve;
    (v) flushing said first check valve with said first clean fluid from said accumulator cavity or said void such that at least a first valve seat is substantially free of said particles after said flushing;
    (vi) said first check valve having said first valve seat, said first valve seat capable of seating against another surface to substantially impede the flow of a material through said first check valve.

2. The method of claim 1, wherein said first separator is a hydrocyclone.

3. The method of claim 2, wherein the particle laden slurry is received into said hydrocyclone tangentially and said first check valve is positioned at a bottom of said hydrocyclone.

4. The method of claim 3, wherein said tangential receipt of the particle laden slurry is sufficient to create rotation within said hydrocyclone and the rotating moment gyration of centrifugal force slings said particles to an inner wall of said hydrocyclone such that said particles collect at said bottom of said hydrocyclone and said first clean fluid is forced into said accumulator cavity or said void.

5. The method of claim 4, wherein said accumulator cavity or said void is substantially centered at a top of said hydrocyclone.

6. The method of claim 5, wherein said first clean fluid is collected in said accumulator cavity and additionally comprising the step of increasing the downward pressure on said first clean fluid in said accumulator cavity via actuation of a hydraulic, pneumatic, or mechanical force.

7. The method of claim 2, wherein said hydrocyclone has grooves on an inside surface, said grooves continuous and spiraling towards said first check valve.

8. The method of claim 1, wherein said first separator is a separator employing one or more particle filter screens.

9. The method of claim 1, wherein said first check valve has an open state and a closed state and said step of flushing occurs before said first check valve returns to said closed state such that when said first check valve returns to said closed state said first valve seat is substantially free of said particles.

10. The method of claim 1, wherein all of said steps are accomplished without the need for a cleansing liquid other than said first clean fluid.

11. The method of claim 1, wherein all of said steps are accomplished without the need for additional timing mechanisms.

12. The method of claim 1, wherein said first clean fluid is collected in said accumulator cavity and the method additionally comprises the steps of:
 (i) receiving said first particle fluid and said first clean fluid from said first separator into a second separator cavity of a second separator, said combination of said first particle fluid and said first clean fluid forming a second particle laden slurry;
 (ii) separating at least a portion of said second particle laden slurry with said second separator, thereby:
  creating a second particle fluid, said second particle fluid more concentrated with said particles than said second particle laden slurry; and
  creating a second clean fluid, said second clean fluid substantially free of said particles;
 (iii) drawing said second clean fluid into said void created by the suction stroke of said positive displacement pump;
 (iv) permitting said second particle fluid to travel through a second check valve;
 (v) flushing said second check valve with said second clean fluid from said void such that at least said second valve seat is substantially free of said particles after said flushing;
 (vi) said second check valve having a second valve seat, said second valve seat capable of seating against another surface to substantially impede the flow of a material through said second check valve.

13. The method of claim 12, wherein said flushing is accomplished by a discharge stroke of said positive displacement pump.

14. The method of claim 13, wherein said suction stroke of said positive displacement pump creates a low pressure at a bottom of said first check valve causing said first check valve to enter said open state.

15. The method of claim 14, wherein said discharge stroke of said positive displacement pump:
 (i) assists said first check valve moving from said open state to said closed state;
 (ii) forces said second check valve to said open state;
 (iii) forces said second particle fluid through said second check valve; and
 (iv) causes said second clean fluid to flush said second valve seat.

16. The method of claim 12, wherein said first check valve is biased to said closed state, said bias able to be overcome by creating a low pressure area at a bottom of said first check valve with said suction stroke of said positive displacement pump.

17. The method of claim 12, wherein said second separator is a separator employing one or more particle filter screens.

18. The method of claim 12, wherein said first separator and/or said second separator is one of the following:
 hydrocyclone separator;
 multiple hydrocyclone separators fluidly connected;
 spiral flow separator;
 separator helix;
 centrifugation separator;
 multi-stage separator;
 tubular fluid separator;
 filter screen separator; or
 rotating separator.

19. The method of claim 12, wherein said first check valve additionally comprises grooved spaces to permit said particle fluid to travel along said grooved spaces.

20. The method of claim 19, wherein said grooved spaces are oriented in an orientation other than parallel to said first check valve.

21. The method of claim 19, wherein said grooved spaces are of a sufficient length such that after said flushing step and as said first check valve is returning to said closed state, a backflow of said particles cannot reach said first valve seat before said first check valve has returned to said closed state.

22. The method of claim 19, wherein said grooved spaces are optimized to accommodate said particle.

23. The method of claim 1, wherein said first check valve additionally comprises grooved spaces to permit said particle fluid to travel along said grooved spaces.

24. The method of claim 23, wherein said grooved spaces are of a sufficient length such that after said flushing step and as said first check valve is returning to said closed state, a backflow of said particles cannot reach said first valve seat before said first check valve has returned to said closed state.

25. The method of claim 23, wherein said grooved spaces are oriented in an orientation other than parallel to said first check valve.

26. The method of claim 23, wherein said grooved spaces are optimized to accommodate said particle.

27. The method of claim 1, wherein the method can accommodate said particles being any one or more of the following:
 sand;
 waste water;
 metal slag;
 copper slag;
 diamonds;
 glass beads;
 composites;
 wood chips;
 nut shells;
 pulverized minerals;
 garnet sand;
 ball bearings;
 steel shot;
 drilling mud;
 oilfield fluid; or
 proppant.

28. The method of claim 1, wherein said first separator is one of the following:
 hydrocyclone separator;
 multiple hydrocyclone separators fluidly connected;
 spiral flow separator;
 separator helix;
 centrifugation separator;
 multi-stage separator;
 tubular fluid separator;
 filter screen separator; or
 rotating separator.

29. An apparatus for separating and pumping a particle laden slurry, the apparatus comprising:
 a first separator, said first separator having a first separator cavity, said first separator cavity receiving the particle laden slurry under pressure, the particle laden slurry comprising:
  a fluid; and
  abrasive and/or solid particles;
 wherein said first separator separates at least a portion of the particle laden slurry with said first separator to create:
  a first particle fluid, said first particle fluid more concentrated with said particles than the particle laden slurry; and a first clean fluid, said first clean fluid substantially free of said particles;
an accumulator cavity or a void receiving said clean fluid under pressure, wherein said void is created by the suction stroke of a positive displacement pump;
a first check valve, said first check valve permitting said first particle fluid to travel out of said first separator and said first clean fluid from said first accumulator cavity is forced through said first check valve such that said first check valve may substantially seal against a first valve seat substantially free of said particles between said first check valve and said first valve seat.

30. The apparatus of claim 29, wherein said first separator is a hydrocyclone.

31. The apparatus of claim 30, wherein the particle laden slurry is received into said hydrocyclone tangentially and said first check valve is positioned at a bottom of said hydrocyclone.

32. The apparatus of claim 31, wherein said tangential receipt of the particle laden slurry is sufficient to create rotation within said hydrocyclone and the rotating moment gyration of centrifugal force slings said particles to an inner wall of said hydrocyclone such that said particles collect at said bottom of said hydrocyclone and said first clean fluid is forced into said accumulator cavity or said void.

33. The apparatus of claim 32, wherein said accumulator cavity or said void is substantially centered at a top of said hydrocyclone.

34. The apparatus of claim 33, wherein said first clean fluid is received in said accumulator cavity and additionally comprising a hydraulic, pneumatic, or mechanical force device, said force device increasing the downward pressure on said first clean fluid in said accumulator cavity.

35. The apparatus of claim 30, wherein said hydrocyclone has grooves on an inside surface, said grooves continuous and spiraling towards said first check valve.

36. The apparatus of claim 29, wherein said first separator is a separator employing one or more particle filter screens.

37. The apparatus of claim 29, wherein the apparatus does not need a cleansing liquid other than said first clean fluid.

38. The apparatus of claim 29, wherein the apparatus does not need additional timing mechanisms.

39. The apparatus of claim 29, wherein said first clean fluid is received in said accumulator cavity and the apparatus additionally comprises:
a second separator, said second separator having a second separator cavity, said second separator cavity receiving both said first particle fluid and said first clean fluid from said first separator combining to form a second particle laden slurry, wherein said second separator separates at least a portion of said second particle laden slurry into:
a second particle fluid, said second particle fluid more concentrated with said particles that the second particle laden slurry; and
a second clean fluid, said second clean fluid substantially free of said particles;
wherein said void receives said second clean fluid under pressure;
a second check valve, said second check valve permitting said second particle fluid to travel out of said second separator and said second clean fluid from said void is forced through said second check valve such that said second check valve may substantially seal against a second valve seat substantially free of said particles between said second check valve and said second valve seat.

40. The apparatus of claim 39, wherein a discharge stroke of said positive displacement pump forces said second clean fluid from said void.

41. The apparatus of claim 40, wherein a suction stroke of said positive displacement pump creates a low pressure at a bottom of said first check valve causing said first check valve to permit said first particle fluid and said first clean fluid to travel out of said first separator.

42. The apparatus of claim 41, wherein said discharge stroke of said positive displacement pump:
assists said first check valve moving substantially sealing;
forces said second particle fluid through said second check valve; and
forcing said second clean fluid through said second check valve.

43. The apparatus of claim 39, wherein said first check valve is biased to seal against said first valve seat, said bias able to be overcome when said suction stroke of said positive displacement pump creates a low pressure area at a bottom of said first check valve.

44. The apparatus of claim 39, wherein said second separator is a separator employing one or more particle filter screens.

45. The apparatus of claim 39, wherein said first separator and/or said second separator is one of the following:
hydrocyclone separator;
multiple hydrocyclone separators fluidly connected;
spiral flow separator;
separator helix;
centrifugation separator;
multi-stage separator;
tubular fluid separator;
filter screen separator; or
rotating separator.

46. The apparatus of claim 39, wherein said first check valve additionally comprises grooved spaces to permit said particle fluid to travel along said grooved spaces.

47. The method of claim 46, wherein said grooved spaces are oriented in an orientation other than parallel to said first check valve.

48. The apparatus of claim 46, wherein said grooved spaces are of a sufficient length such that after said first clean fluid is forced through said first check valve, a backflow of said particles cannot reach said first valve seat before said first check valve has sealed against said first valve seat.

49. The apparatus of claim 46, wherein said grooved spaces are optimized to accommodate said particle.

50. The apparatus of claim 29, wherein said first check valve additionally comprises grooved spaces to permit said particle fluid to travel along said grooved spaces.

51. The method of claim 50, wherein said grooved spaces are oriented in an orientation other than parallel to said first check valve.

52. The apparatus of claim 50, wherein said grooved spaces are of a sufficient length such that after said first clean fluid is forced through said first check valve, a backflow of said particles cannot reach said first valve seat before said first check valve has sealed against said first valve seat.

53. The apparatus of claim 52, wherein said grooved spaces are optimized to accommodate said particle.

54. The apparatus of claim 29, wherein the apparatus can accommodate said particles being any one or more of the following:
sand;
waste water;
metal slag;
copper slag;

diamonds;
glass beads;
composites;
wood chips;
nut shells;
pulverized minerals;
garnet sand;
ball bearings;
steel shot;
drilling mud;
oilfield fluid; or
proppant.

55. The apparatus of claim 29, wherein said first separator is one of the following:
hydrocyclone separator;
multiple hydrocyclone separators fluidly connected;
spiral flow separator;
separator helix;
centrifugation separator;
multi-stage separator;
tubular fluid separator;
filter screen separator; or
rotating separator.

\* \* \* \* \*